Figure 1:
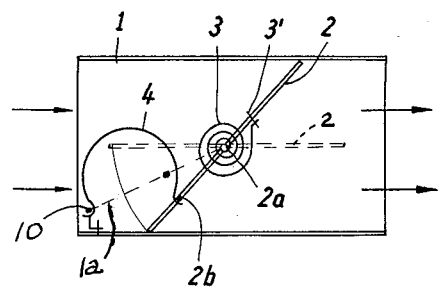

May 14, 1963   S. KOFINK ETAL   3,089,647
CONTROL DEVICE FOR DAMPERS
Filed Feb. 21, 1961

*Inventors*
SIEGFRIED KOFINK
FRITZ REUTER
*ATTORNEYS*

United States Patent Office 3,089,647
Patented May 14, 1963

3,089,647
CONTROL DEVICE FOR DAMPERS
Siegfried Kofink, Zell (Neckar), and Fritz Reuter, Esslingen (Neckar), Germany, assignors to J. Eberspächer, Esslingen (Neckar), Germany, a German firm
Filed Feb. 21, 1961, Ser. No. 118,207
5 Claims. (Cl. 236—48)

This invention relates in general to control devices and in particular to a new and useful valve operating combination bimetallic member and auxiliary spring particularly adapted for operating a flap valve in a fluid duct, such as an air heating channel in a motor vehicle, for example.

Bimetallic controls are known for operating valves of a type in which the temperatures of fluid flowing through the valve cause either expansion or contraction of the bimetallic element to gradually open or close the valve disposed in the fluid conduit. The operation of such valves is very gradual with the valve flap following the direct movement of the bimetallic element in accordance with the temperature changes in the area being controlled. In many instances this gradual control is acceptable. However, in other instances it is most desirable that temperature change be employed to cause an instantaneous opening or closing of the fluid channel. For example, in an automobile heating duct it is advantageous that the hot air channel be opened instantaneously or rapidly after the fluid around the valve has achieved a certain temperature. It is also desirable that the valve close just as rapidly. Neither of these operations is possible with the bimetallic valve operating controls presently known.

In accordance with the present invention there is provided a valve control including a bimetallic element which is sensitive to temperature change to open and close the valve, but in addition includes spring means which tends to oppose the opening of the valve during the initial expansive stages of the bimetallic element, but effects a rapid swing opening of the valve to a full open position after the bimetallic element has expanded a sufficient amount to force the spring member past its center-line position to effect "snapping over" of the valve element.

In accordance with one embodiment of the invention a bimetallic coil spring is mounted for rotation about the same axis of rotation as a flap or damper in a fluid conduit. An expansion of this bimetallic spring causes rotation of the valve flap to an open position and contraction causes rotation to a closed position. The inventive arrangement includes a U-shaped spring member which is secured within the fluid conduit at one end and connected at its other end to the valve flap. The arrangement is such that the spring opposes opening movement of the flap under the actuation of the bimetallic coil spring, but upon the attainment of a sufficient temperature the force of the bimetallic coil spring is effective to overcome the other spring and once the other spring moves beyond its center position it aids in the opening movement of the bimetallic coil spring. A similar arrangement is provided in another embodiment in which the valve flap is provided with a disc control having a central slot at substantially the location of the pivot of a valve damper or flap. Springs are arranged on either side of a bimetallic spring which extends into the slot of the disc and are biased against the ends of the disc to resist the initial opening movement caused by the bimetallic spring and thereafter to aid in the movement to cause a snap opening of the damper.

Accordingly, it is an object of this invention to provide an improved control for a damper or flap and the like comprising a bimetallic element and spring means providing an instantaneous snap opening of the control device after the bimetallic element has expanded to a predetermined amount.

A further object of the invention is to provide an improved bimetallic control device.

A further object of the invention is to provide a bimetallic control including a bimetallic coil spring which is effective upon expansion to urge a member toward an open direction and an auxiliary spring arranged to oppose the opening movement caused by the bimetallic coil spring and thereafter aid such movement.

A further object of the invention is to provide a control device including a damper having a circular disc attached thereto with diametrically opposed projections and a groove cut into one side intermediate the projections, and further including spring members biasing the projections on each side of the disc to oppose the initial opening movement affected by a bimetallic element which is arranged in the groove, and thereafter to aid in the opening movement.

A further object of the invention is to provide a bimetallic control device which is simple in design, rugged in construction and economical to manufacture.

The various features of novelty which characterize the invention are pointed out with particularity in the claims annexed to and forming apart of this specification. For a better understanding of the invention, its operating advantages and specific objects attained by its use, reference should be had to the accompanying drawings and descriptive matter in which there are illustrated and described preferred embodiments of the invention.

Figure 2:
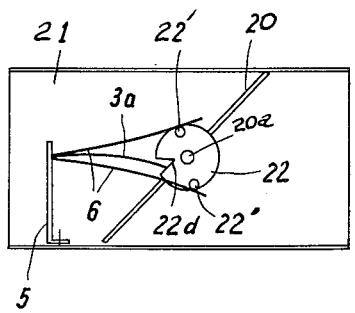

In the drawings:

FIG. 1 is a somewhat schematic sectional view of a fluid conduit having a bimetallic damper control device constructed in accordance with the invention; and FIG. 2 is a view similar to FIG. 1 of another embodiment of the invention.

Referring to the drawings in particular, the invention embodied therein in FIG. 1 includes a heating duct 1 in which there is disposed a flap or damper 2 which is pivotally mounted at a central pivot 2a, a bimetallic coil spring is affixed at its inner end to the pivot 2a and is secured at its outer end to the damper or flap 2 at a location 3' spaced from the pivot 2a. Expansion of the bimetallic coil spring 3 tends to cause an opening movement of the flap 2 from the closed position indicated in solid lines in FIG. 1 to the dotted line position.

In accordance with the invention, the action of the bimetallic spring 3 is aided by means of a U-shaped spring member 4 having one end secured to the conduit 1 as at 10 and an opposite end secured to the damper 2 at the location 2b. The spring 4 is disposed so that it biases the damper 2 to the solid line closed position indicated in FIG. 1. After the bimetallic coil spring 3 expands to a predetermined amount it achieves a sufficient force to move the damper 2 to intersect the spring center line position 1a, i.e., a line intersecting the connection 10 and the pivot 2a. At this location the spring 4 acts to instantaneously deflect the damper to the fully opened position indicated in dotted lines.

In FIG. 2 a somewhat modified embodiment is indicated in which a damper 20 is rotatably mounted on a central pivot 20a within a fluid conduit 21. One side of the damper 20 is provided with a disc 22 having side projections 22' at diametrically opposite locations adjacent the periphery thereof. The disc 22 also includes a cutaway segment or groove 22d.

In accordance with the invention, in this embodiment a mounting bracket 5 is provided for a bimetallic element or spring 3a which, as indicated in FIG. 2, is shown in a fully contracted position with its end in the groove 22d urging the disc 22 in a counter-clockwise direction to close the damper or flap 20. In addition to the bimetallic spring 3a there are provided two spring elements 6 which are connected at one end to the bracket 5 and which bear against the projection portions 22' on the disc 22. In the position indicated in the drawings, the springs 6 bias the damper 20 to a closed position. Once the bimetallic spring 3a expands to a condition in which it urges the disc 22 to rotate clockwise, it is opposed by a spring 6 until the disc portion 22' rotates beyond the vertical center line of the disc 22 at which instance the springs 6 aid in the movement of the damper 20 to its fully opened position. In this manner, the flap is instantaneously opened in one single stroke. The same effect occurs during the return movement of the bimetallic spring 3a during which the flap 20 again closes the heating channel.

It is possible to adjust the arrangement set forth above in such a manner that the control elements instantaneously open at 100° C. and that they instantaneously close again when it is cooled down to 20° C.

While specific embodiments of the invention have been shown and described in detail to illustrate the application of the invention principles, it will be understood that the invention may be embodied otherwise without departing from such principles.

What is claimed is:

1. An adjusting device for hot air heating channels comprising a rotatable damper in a channel rotatable between a position closing a channel to a position disposed across a channel to fully open the latter, a disk having a recess connected to said damper for rotation therewith, said disk being mounted to said damper with the plane of said disk being substantially normal to the axis of said damper, a flat bimetallic spring having one end mounted adjacent the pivotal location of said damper and an opposite end in said disk recess effective upon expansion to urge said damper from a closed position to an open position and upon movement in an opposite direction to urge said damper from an open position to a closed position, and a spring means mounted on said channel and having opposite ends operatively connected to said disc and disposed to urge said damper to a closed position but to aid said bimetallic spring after initial movement of the damper to quickly move said damper to a fully opened position.

2. A damper control for a heating duct comprising a damper flap pivotally mounted at its center and movable between an oblique position closing a channel to a substantially horizontal position opening a channel, a disc having a recess connected to said damper for rotation therewith, bimetallic spring means connected to said disc to move said damper between said opened and closed positions upon expansion and contraction of said bimetallic spring means, and auxiliary spring means having one end secured and an opposite end connected to said disc biasing said disc and said damper to a closed position but being effective upon movement of said disc to a predetermined position to bias said disc with said damper to a fully opened position, said disc having projections at diametrically opposite ends thereof and a groove cut in the periphery substantially between said diametrically opposite projections, said bimetallic element including a member held at one end and extending into said groove at its opposite end, said spring means further including spring elements fixedly mounted at their outer ends and biased into contact with said projections in a position to urge said disc and said damper to a closed position but being effective upon movement of said projections beyond the center line of the center of rotation of said damper to urge said damper to an opened position.

3. A control device for a pivotally mounted damper and the like comprising a bimetallic means at one end adapted to be operatively engaged with a damper for movement of a damper between an opened and a closed position upon expansion and contraction of said means, means holding said bimetallic element at its other end, and spring means effective to aid in the movement produced by said bimetallic means after said bimetallic means has moved an initial amount, said bimetallic means including a disk adapted to be mounted to a damper being actuated with the plane of the disk being substantially normal to such element and being rotatable about the same axis, and springs anchored at their one ends and having opposite ends biased against said disk on respective diametrically opposite sides thereof to inhibit rotation of said disk during initial movement thereof and to aid in the rotational movement thereof after a predetermined initial movement.

4. A control device for a pivotally mounted damper and the like comprising a disk adapted to be affixed to a damper for rotation therewith with the plane of said disc being substantially normal to the damper, and mounted for rotation about the same axis, said disk having a peripheral recess, a bimetallic strip, means holding said bimetallic strip at one end, the opposite end of said strip extending into said disk recess, said bimetallic strip being movable on temperature change to correspondingly move said disk through contact of the walls of said disk adjacent the recess, and means to bias said disk to a completely closed position and to completely open position.

5. An adjusting flap for hot air heating channels in a heating device for a motor car comprising a disk mounted substantially normal for rotation about a central pivot and mounted substantially normal to the adjusting flap, said disk having a peripheral recess, a substantially flat bimetallic spring, means mounting said bimetallic spring at its one end, the opposite end extending into the peripheral recess of said disk, and first and second leaf springs held at their one ends and having their opposite ends biased against respective diametrically opposite sides of said disk to oppose movement of said disk in directions away from a fully closed and a fully opened position.

References Cited in the file of this patent

UNITED STATES PATENTS 2,011,546    Waltenberg  ------------- Aug. 13, 1935
2,238,043    Kleen  ------------------ Apr. 15, 1941